J. BOLICK.
VEHICLE WHEEL MOUNTING.
APPLICATION FILED MAY 23, 1912.
1,132,825.
Patented Mar. 23, 1915.
2 SHEETS—SHEET 1.
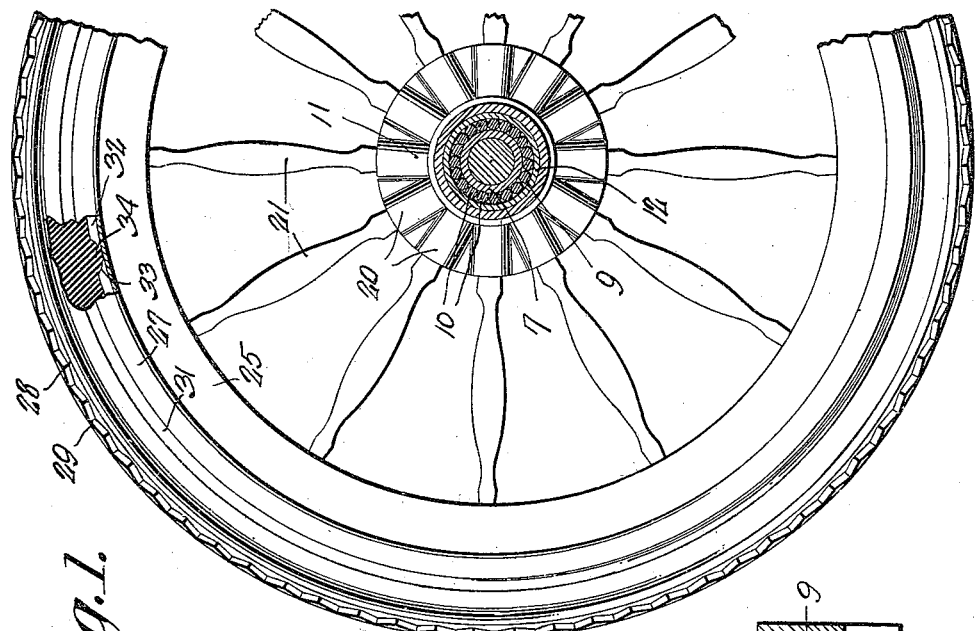
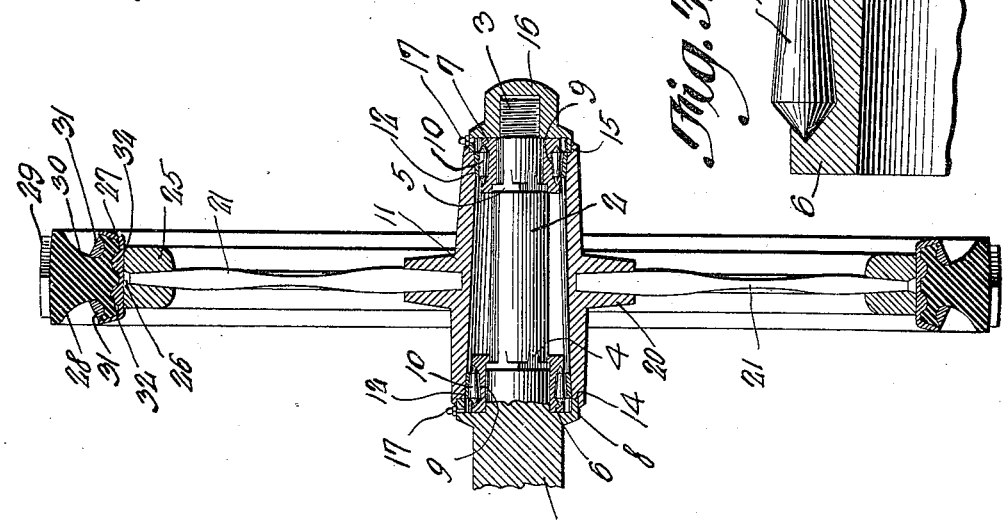
Witnesses
Jerome Bolick  Inventor
by
Attorneys

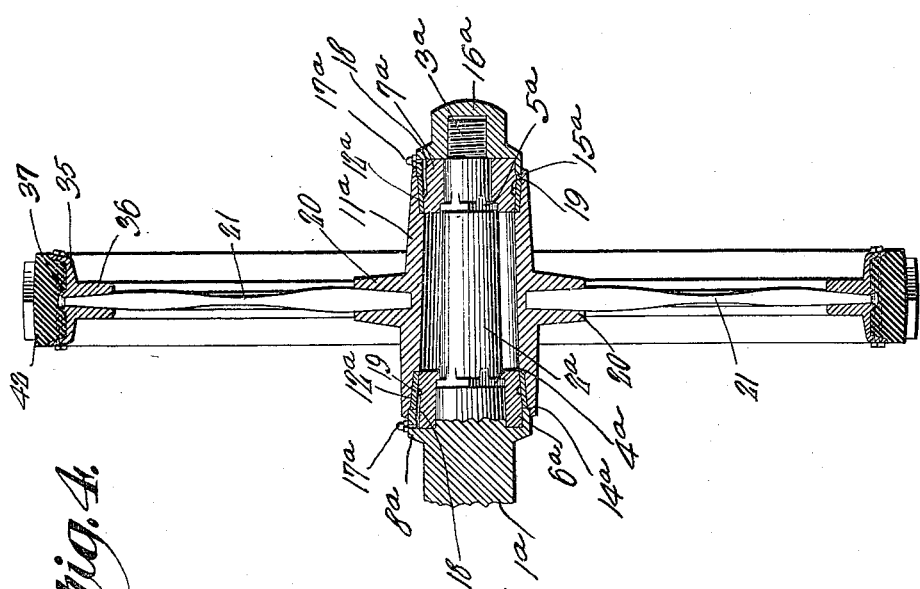

UNITED STATES PATENT OFFICE.

JEROME BOLICK, OF CONOVER, NORTH CAROLINA.

VEHICLE WHEEL-MOUNTING.

1,132,825. Specification of Letters Patent. Patented Mar. 23, 1915.

Application filed May 23, 1912. Serial No. 699,260.

*To all whom it may concern:*

Be it known that I, JEROME BOLICK, a citizen of the United States, residing at Conover, in the county of Catawba and State of North Carolina, have invented a new and useful Vehicle Wheel-Mounting, of which the following is a specification.

The object of the present invention is to provide novel means for mounting a wheel hub upon an axle spindle.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings, Figure 1 shows in side elevation, a wheel embodying the present invention, parts being broken away; Fig. 2 is a diametrical section of the structure shown in Fig. 1; Fig. 3 is a detail enlarged from Fig. 2; and Fig. 4 is a section showing a modified form of the invention.

In carrying out the invention there is provided an axle 1, having a spindle 2 at its end and terminating in a threaded end 3. The axle is provided with an annular flange 8 at the basal end of the spindle, and the spindle is of peculiar formation, as clearly seen by reference to Fig. 2. Thus, the basal portion of the spindle is circular in cross section, and the body portion of the spindle between the basal and free end portions is of circular cross section and is of smaller diameter than the said basal portion, while the free end portion of the spindle is of circular cross section and of smaller diameter than the body portion. The shoulder formed at the inner end of the body portion of the spindle is of polygonal contour, as at 4, with the corners lying between the surfaces of the basal and body portions of the spindle, and the shoulder formed at the inner end of the free end portion of the spindle is of polygonal contour, as at 5, with the corners lying between the surfaces of the body and free end portions of the spindle. An annular bearing or bearing cone 6 is mounted snugly upon the basal portion of the spindle and has a contracted portion snugly embracing the body portion of the spindle adjacent the shoulder or polygonal portion 4. The cone 6 is provided with an inner polygonal recess receiving the shoulder or polygonal portion 4. An annular bearing or bearing cone 7 is mounted snugly upon the free end portion of the spindle and has a polygonal recess at its inner end receiving the shoulder or polygonal portion 5. Thus, the cones 6 and 7 may be moved outwardly upon the respective portions of the spindle, when the cones are released, so that the cones may be rotated to new positions and moved back to normal position, at which position they will be prevented from rotating. The cones 6 and 7 are provided with races 9 in which are located anti-friction rollers 10, each roller 10 comprising a central frusto-conical body portion and conical ends, the cones 6 and 7 overhanging the conical ends of the rollers, to hold the same in the said races.

The hub is denoted generally by the numeral 11 and is equipped in its interior with bearing rings 12 which engage the rollers 10. At one end, the hub 11 is recessed as indicated at 14 to receive the annular flange 8, the hub at the other end being recessed as indicated at 15, to receive a nut 16 which is threaded on the portion 3 of the axle spindle. The annular flange 8 and the nut 16 carry oil cups 17 which discharge upon the cones 6 and 7 and serve to lubricate the rollers 10. The nut 16 which is threaded upon the free end of the spindle retains the bearing cone 7 upon the free end portion of the spindle in engagement with the shoulder or polygonal portion 5, and it will be noted that the hub is journaled upon the cones 6 and 7 between the flange 8 of the axle and the nut 16. At this point it may be stated that in assembling the wheel with the axle, the cone 6 is slipped over the polygonal portion 4 of the axle, the hub 11 being then mounted in place, whereupon the cone 7 is inserted into the open end of the hub, the cone 7 being retained by the nut 16. The bearing surfaces of the rollers 10 slant toward the median plane of the wheel, and thus the wheel is prevented from moving longitudinally of the spindle 2.

In that form of the invention which appears in Fig. 4, the parts above described are referred to with the suffix "a." In that form of the invention which appears in Fig. 4, the rollers 10 are omitted, the bearing rings 12ª engaging directly with the cones 6ª and 7ª. The oil cups 17ª discharge into ducts 18 formed in the cones 6ª and 7ª, transversely of the same, the ducts 18 discharging into grooves 19 which extend around the cones. In both forms of the invention, the hubs are provided with sockets 20, receiving spokes, denoted generally by the numeral 21. The spoke 21 includes tapered ends 21', between which a flat, resilient portion 23 is located, the spokes being reduced in diameter as indicated at 24, between the portions 21 and 23. The spokes are preferably fashioned from metal, and the flat portions 23 thereof lie in the median plane of the wheel. When an obstacle is encountered, and under other conditions, requiring resiliency, the spokes 21 will yield transversely of the wheel, thus affording the desired resiliency.

Referring to Fig. 2, the spokes 21 are engaged in a felly 25, the outer ends of the spokes being, if desired, riveted down into the felly, as indicated at 26. Secured to the felly 25 is a trough-shaped rim 27 in which the tire 28 fits, the tire being provided at its periphery with anti-skidding members 29 which, if desired, may be of diamond shape. The tire 28 is equipped in its side faces with recesses 30, in which are located retaining rings 31 which serve to secure the tire upon the rim. The outer face of the rim 27 is equipped with parallel, circumscribing ribs 32, having, as shown in Fig. 1, transverse recesses 33, into which fit projections 34 upon the tire, for the obvious purpose of preventing the tire from creeping circumferentially of the wheel.

Referring to Fig. 4, the spokes are received in a spoke flange 36 formed integrally with the rim 35. The rim 35 is equipped with a central, circumscribing rib 37, engaged by the tire 42, the spokes being riveted into the rim 37.

Having thus described the invention, what is claimed is:—

In a device of the character described, an axle having a spindle at its end, and a flange at the basal end of the spindle, the basal portion of the spindle being circular in cross section, the body portion of the spindle between the basal and free end portions being of circular cross section and of smaller diameter than the said basal portion, the free end portion of the spindle being of circular cross section and of smaller diameter than the body portion, the shoulder formed at the inner end of the body portion of the spindle being of polygonal contour with the corners lying between the surfaces of the basal and body portions of the spindle, the shoulder formed at the inner end of the free end portion of the spindle being of polygonal contour with the corners lying between the surfaces of the body and the free end portions of the spindle, annular bearings mounted snugly upon the basal and free end portions of the spindle, the bearing mounted upon the basal portion of the spindle having a contracted portion snugly embracing the body portion of the spindle adjacent the first mentioned shoulder and having an inner polygonal recess receiving the said first mentioned shoulder, the bearing mounted upon the free end portion of the spindle having a polygonal recess at its inner end receiving the second mentioned shoulder, a nut threaded upon the free end of the spindle to retain the second mentioned bearing upon the free end portion of the spindle and in engagement with the second mentioned shoulder, and a hub journaled upon the bearings between the said flange and nut.

In testimony that I claim the foregoing as my own, I have hereto affixed my signature in the presence of two witnesses.

JEROME BOLICK.

Witnesses:
SELINA WILLSON,
I. E. SIMPSON.

Copies of this patent may be obtained for five cents each, by addressing the "Commissioner of Patents, Washington, D. C."